US012548899B2

(12) United States Patent
Zheng et al.

(10) Patent No.: US 12,548,899 B2
(45) Date of Patent: Feb. 10, 2026

(54) ANTENNA DEVICE AND MANUFACTURING METHOD THEREFOR, CONTROL METHOD AND ELECTRONIC DEVICE

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Yang Zheng, Beijing (CN); Jia Fang, Beijing (CN); Feng Qu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 127 days.

(21) Appl. No.: 18/261,600

(22) PCT Filed: Oct. 29, 2021

(86) PCT No.: PCT/CN2021/127415
§ 371 (c)(1),
(2) Date: Jul. 14, 2023

(87) PCT Pub. No.: WO2023/070522
PCT Pub. Date: May 4, 2023

(65) Prior Publication Data

US 2024/0079775 A1 Mar. 7, 2024

(51) Int. Cl.
*H01Q 3/44* (2006.01)
*H01Q 9/04* (2006.01)
*H01Q 13/06* (2006.01)

(52) U.S. Cl.
CPC ............. *H01Q 3/44* (2013.01); *H01Q 9/0407* (2013.01); *H01Q 13/06* (2013.01)

(58) Field of Classification Search
USPC .......................................................... 343/722
See application file for complete search history.

(56) References Cited

U.S. PATENT DOCUMENTS

2004/0100405 A1* 5/2004 Mohamadi ........... H01Q 21/065 343/700 MS
2018/0026374 A1* 1/2018 Chen ........................ H01Q 3/44 343/810
2018/0076521 A1 3/2018 Mehdipour et al.

FOREIGN PATENT DOCUMENTS

CN 107275805 A 10/2017
CN 209249695 U * 8/2019

(Continued)

OTHER PUBLICATIONS

European Patent Application No. 21961880.8, European Search Report, dated Jun. 14, 2024.

(Continued)

*Primary Examiner* — Crystal L Hammond
*Assistant Examiner* — Brandon Sean Woods
(74) *Attorney, Agent, or Firm* — DINSMORE & SHOHL LLP

(57) ABSTRACT

The present disclosure provides an antenna device and a manufacturing method therefor, a control method, and an electronic device. The antenna device includes a first and a second substrate structure, and a liquid crystal layer between the first and the second substrate structure. The first substrate structure includes a first substrate and multiple antenna patches. The second substrate structure is on the side of the multiple antenna patches away from the first substrate, and includes a second substrate and a metal layer having multiple gaps. One gap corresponds to one antenna patch, the region where the orthographic projection of each gap on the first substrate overlaps that of the corresponding antenna patch is a first region, the orthographic projection of each (Continued)

gap on the first substrate further includes a second region and a third region, and the third region is located between the second region and the third region.

15 Claims, 7 Drawing Sheets

(56) References Cited

FOREIGN PATENT DOCUMENTS

| | | | | |
|---|---|---|---|---|
| CN | 110797669 | A | | 2/2020 |
| CN | 111682317 | A | * | 9/2020 |
| CN | 111816968 | A | * | 10/2020 |
| CN | 112631010 | A | | 4/2021 |
| CN | 112909519 | A | | 6/2021 |
| WO | 2019189151 | A1 | | 10/2019 |

OTHER PUBLICATIONS

Li Yan et al., Simulation and Experiment on SIW Slot Array Antennas, IEEE Microwave and Wireless Components Letters, vol. 14, No. 9, Sep. 2004, p. 446-448.

Saeid Ghorbani, et al., Development of a center fed slot array antenna with very low side lobes using ridge gap waveguide (RGW) technology, AEUE International Journal of Electronics and Communications, 125 (2020), https://doi.org/10.1016/j.aeue.2020.153385.

* cited by examiner

ANTENNA DEVICE AND MANUFACTURING METHOD THEREFOR, CONTROL METHOD AND ELECTRONIC DEVICE

CROSS-REFERENCE TO RELATED APPLICATIONS

The present application is a U.S. National Stage Application under 35 U.S.C. § 371 of International Patent Application No. PCT/CN2021/127415, filed on Oct. 29, 2021, the disclosure of which is incorporated by reference herein in its entirety.

TECHNICAL FIELD

The present disclosure relates to an antenna device and a manufacturing method therefor, a control method and an electronic device.

BACKGROUND

The leaky wave antenna has the advantages of high directivity and compact structure. In the related art, in the mode of beam scanning, the beam of the leaky wave antenna has a relatively small scanning angle.

SUMMARY

According to an aspect of the embodiments of the present disclosure, an antenna device is provided. The antenna device comprises: a first substrate structure, comprising: a first substrate, and a plurality of antenna patches located on a first side of the first substrate; a second substrate structure located on one side of the plurality of antenna patches away from the first substrate, and comprising: a second substrate, and a metal layer having a plurality of slots and located on a second side of the second substrate close to the first substrate, wherein one slot corresponds to one antenna patch, a region where an orthographic projection of each slot on the first substrate overlaps with an orthographic projection of a corresponding antenna patch on the first substrate is a first region, the orthographic projection of each slot on the first substrate further comprises a second region and a third region, and the first region is located between the second region and the third region; and a liquid crystal layer located between the first substrate structure and the second substrate structure.

In some embodiments, an orthographic projection of each antenna patch on the first substrate further comprises a fourth region and a fifth region, and the first region is located between the fourth region and the fifth region.

In some embodiments, the first substrate structure further comprises: a plurality of first signal lines located on the first side of the first substrate, wherein each first signal line is connected to at least one of the plurality of antenna patches.

In some embodiments, the plurality of antenna patches is arranged in a matrix, a same row of antenna patches is connected to a same first signal line, and different rows of antenna patches are connected to different first signal lines.

In some embodiments, an orthographic projection of at least one of the plurality of first signal lines on the first substrate does not overlap with the orthographic projection of each slot on the first substrate.

In some embodiments, the second substrate structure further comprises: at least one second signal line located on the second side of the second substrate and connected to the metal layer.

In some embodiments, an orthographic projection of the at least one second signal line on the second substrate does not overlap with the orthographic projection of each slot on the first substrate.

In some embodiments, the antenna device further comprises: a waveguide structure located on one side of the second substrate structure away from the first substrate structure and comprising one or more cavities, wherein a bottom of each cavity is provided with at least one row of first metal posts, and each row of first metal posts comprise a plurality of first metal posts arranged in a propagation direction of electromagnetic wave.

In some embodiments, the plurality of first metal posts comprises a first group of first metal posts and a second group of first metal posts spaced apart from each other in the propagation direction of electromagnetic wave, heights of the first group of first metal posts are in a first monotonic change in the propagation direction of electromagnetic wave, and heights of the second group of first metal posts are the same.

In some embodiments, the plurality of first metal posts further comprises a third group of first metal posts, wherein: the second group of first metal posts are located between the first group of first metal posts and the third group of first metal posts, and heights of the third group of first metal posts are in a second monotonic change in the propagation direction of electromagnetic wave, wherein the second monotonic change is contrary to the first monotonic change.

In some embodiments, a cross section of each metal post of the second group of first metal posts along a plane parallel to the bottom has a same shape and a same area.

In some embodiments, the at least one row of first metal posts comprises a plurality of rows of first metal posts spaced apart from each other in a direction perpendicular to the propagation direction of electromagnetic wave.

In some embodiments, a side of each cavity connected to the bottom comprises a plurality of second metal posts.

In some embodiments, the bottom of each cavity is provided with a coaxial feed port.

In some embodiments, the antenna device further comprises: a plurality of support members located between the metal layer and the first substrate, wherein orthogonal projections of the plurality of support members on the first substrate do not overlap with orthogonal projections of the plurality of slots on the first substrate, and do not overlap with orthogonal projections of the plurality of antenna patches on the first substrate.

In some embodiments, the orthographic projections of the plurality of support members on the first substrate surround the orthographic projections of the plurality of slots on the first substrate and surround the orthographic projections of the plurality of antenna patches on the first substrate.

According to another aspect of the embodiments of the present disclosure, an electronic device is provided. The electronic device comprises the antenna device according to any of the above embodiments.

According to a further aspect of the embodiments of the present disclosure, a manufacturing method of an antenna device is provided. The manufacturing method comprises: providing a first substrate structure, wherein the first substrate structure comprises a first substrate and a plurality of antenna patches located on a first side of the first substrate; providing a second substrate structure, wherein the second substrate structure comprises a second substrate and a metal layer having a plurality of slots, the metal layer is located on a second side of the second substrate, and one slot corresponds to one antenna patch; engaging the first substrate structure with the second substrate structure to obtain a space between the first substrate structure and the second substrate structure, wherein after the engaging: the second substrate structure is located on one side of the plurality of antenna patches away from the first substrate, and the metal layer is located on the second side of the second substrate close to the first substrate, and a region where an orthographic projection of each slot on the first substrate overlaps with an orthographic projection of a corresponding antenna patch on the first substrate is a first region, the orthographic projection of each slot on the first substrate further comprises a second region and a third region, and the first region is located between the second region and the third region; and injecting liquid crystal into the space to obtain a liquid crystal layer.

According to still another aspect of the embodiments of the present disclosure, a control method of the antenna device according to any of above embodiments is provided. The control method comprises: controlling a voltage of the plurality of antenna patches and a voltage of the metal layer so that a beam direction of the antenna device is a desired beam direction.

In some embodiments, the controlling a voltage of the plurality of antenna patches and a voltage of the metal layer so that a beam direction of the antenna device is a desired beam direction comprises: determining a first group of antenna patches to which a voltage is required to be applied and a second group of antenna patches to which a voltage is not required to be applied based on holographic principle, according to the desired beam direction; and controlling to apply a voltage to the first group of antenna patches, apply a voltage the metal layer, and not apply a voltage to the second group of antenna patches, so that the beam direction of the antenna device is the desired beam direction.

In some embodiments, a same voltage is applied to the first group of antenna patches.

BRIEF DESCRIPTION OF THE ACCOMPANYING DRAWINGS

The accompanying drawings which constitute a part of this specification, illustrate the embodiments of the present disclosure, and together with this specification, serve to explain the principles of the present disclosure.

The present disclosure may be more explicitly understood from the following detailed description with reference to the accompanying drawings, in which.

Figure 1A:
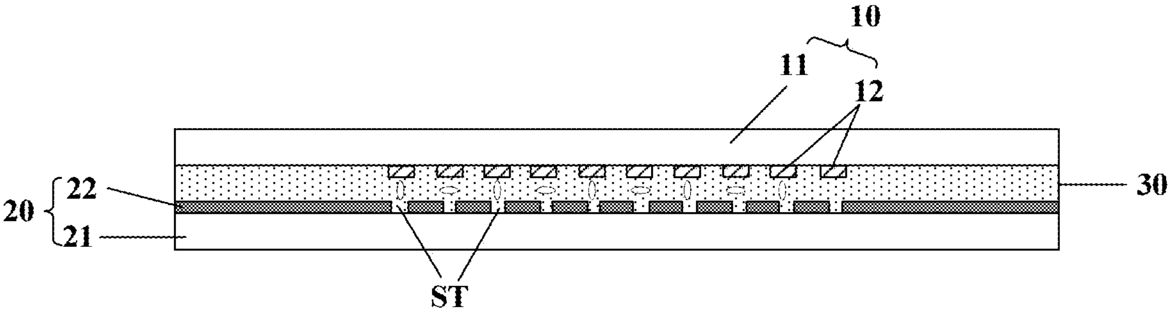
FIG. 1A is a schematic structural view showing an antenna device according to some embodiments of the present disclosure.

It should be understood that the dimensions of various parts shown in the accompanying drawings are not necessarily drawn according to actual proportional relations. In addition, the same or similar components are denoted by the same or similar reference signs.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity, or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and devices known to those of ordinary skill in the relevant art may not be discussed in detail, but where appropriate, these techniques, methods, and devices should be considered as part of this specification.

FIG. 1A is a schematic structural view showing an antenna device according to some embodiments of the present disclosure.

As shown in FIG. 1A, that antenna device comprises a first substrate structure 10, a second substrate structure 20, and a liquid crystal layer 30 located between the first substrate structure 10 and the second substrate structure 20. It should be understood that the antenna device may also comprise a structure that guides electromagnetic wave to propagate, for example, a waveguide structure, which will be described later in conjunction with other embodiments.

The first substrate structure 10 comprises a first substrate 11 and a plurality of antenna patches 12 located on one side of the first substrate 11 (here referred to as a first side, for example, a lower side shown in FIG. 1A). For example, the first substrate 11 is a glass substrate, a quartz substrate, a teflon glass fiber laminate, a phenolic paper laminate, a phenolic glass laminate, or the like. The thickness of the first substrate 11 is, for example, 100 microns to 10 mm. In some embodiments, the material of the antenna patch 12 comprises copper, gold, or silver.

The second substrate structure 20 is located on one side of the plurality of antenna patches 12 away from the first substrate 11. For example, as shown in FIG. 1A, in a case where the plurality of antenna patches 12 is located on the lower side of the first substrate 11, the second substrate structure 20 as a whole is located on the lower side of the first substrate structure 10; for another example, in a case where the plurality of antenna patches 12 is located on an upper side of the first substrate 11, the second substrate structure 20 as a whole is located on the upper side of the first substrate structure 10.

The second substrate structure 20 comprises a second substrate 21 and a metal layer 22 having a plurality of slots ST. The metal layer 22 is located on one side (here referred to as a second side) of the second substrate 21 close to the first substrate 11. For example, the second substrate 21 is a glass substrate, a quartz substrate, a teflon glass fiber laminate, a phenolic paper laminate, a phenolic glass laminate, or the like. The thickness of the second substrate 21 is, for example, 100 microns to 10 mm. In some embodiments, the material of the metal layer 22 comprises copper, gold, or silver.

One slot ST corresponds to one antenna patch 12, that is, a plurality of slots ST corresponds to a plurality of antenna patches 12 in a one-to-one correspondence. The orthographic projection of each slot ST on the first substrate 11 at least partially overlaps with the orthographic projection of a corresponding antenna patch 12 on the first substrate 11. For example, a part of the orthographic projection of a slot ST on the first substrate 11 overlaps with the orthographic projection of a corresponding antenna patch 12 on the first substrate 11, and the remaining part of the orthographic projection of the slot ST does not overlap with the orthographic projection of the corresponding antenna patch 12 on the first substrate 11.

Here, one slot ST and one corresponding antenna patch 12 may be regarded as an antenna unit. The slot ST allows passage of electromagnetic wave which will then radiate through the antenna patch. By adjusting a voltage of the antenna patch 12 and a voltage of the metal layer 21 in each antenna unit, a deflection direction of liquid crystal molecules between the antenna patch 12 and the metal layer 21 can be changed, thereby changing a dielectric constant between the antenna patch 12 and the metal layer 21, and further changing the beam direction of the antenna device as needed.

Figure 1B:
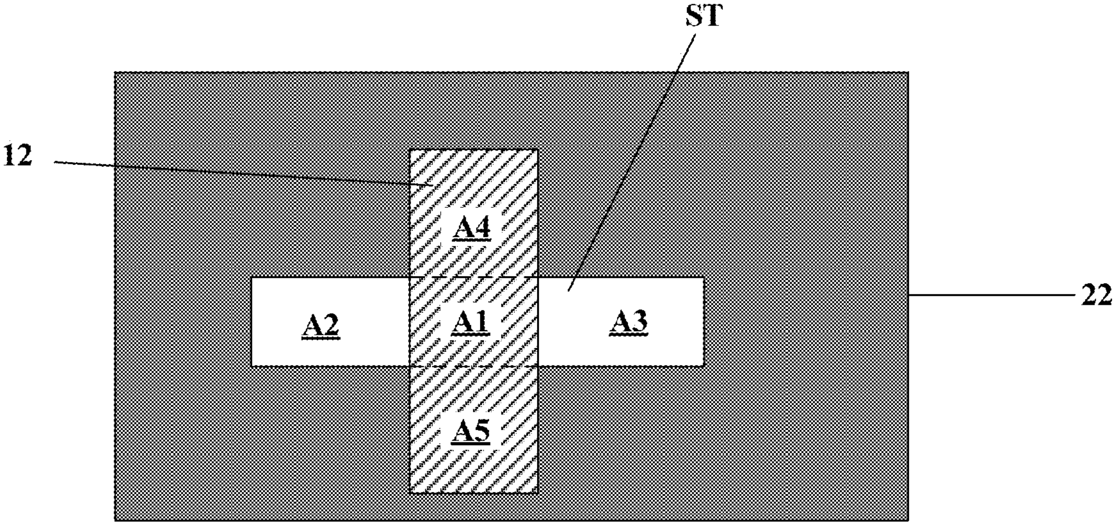
FIG. 1B is a schematic view showing projections of a slot and a corresponding antenna patch according to some embodiments of the present disclosure.

FIG. 1B is a schematic projection view showing projections of a slot and a corresponding antenna patch according to some embodiments of the present disclosure.

As shown in FIG. 1B, the region where the orthographic projection of each slot ST on the first substrate 11 overlaps with the orthographic projection of a corresponding antenna patch 12 on the first substrate 11 is a first region A1, and the orthographic projection of each slot ST on the first substrate 11 further comprises a second region A2 and a third region A3. Here, the first region A1 is located between the second region A2 and the third region A3. In this case, the first region A1 overlaps with the orthographic projection of the antenna patch 12 on the first substrate 11, and the other two regions (i.e., the second region A2 and the third region A3) do not overlap with the orthographic projection of the antenna patch 12 on the first substrate 11. This structure is conductive to improving the energy radiated by the antenna patch.

In the above embodiments, the antenna device comprises a plurality of antenna patches 12 and a metal layer 21 having a plurality of slots ST. With this structure, by changing the voltage of the antenna patch 12 and the voltage of the metal layer 21, the deflection direction of liquid crystal can be changed, thereby changing the energy radiated by the antenna patch 12, and further changing the beam direction of the antenna device. This structure is helpful to expand a beam scanning range of the antenna device.

As some implementations, the ratio of the area of the second region A2 to the area of the first region A1 ranges from 1.5 to 2, for example, is 1.6, 1.7, or the like. As some implementations, the ratio of the area of the third region A3 to the area of the first region A1 ranges from 1.5 to 2, for example, is 1.6, 1.7, or the like. In this way, it is more conductive to improving the energy radiated by the antenna patch.

In other embodiments, as shown in FIG. 1B, the orthographic projection of each antenna patch 12 on the first substrate 11 further comprises a fourth region A4 and a fifth region A5, and the first region A1 is located between the fourth region A4 and the fifth region A5. In this case, the fourth region A4 and the fifth region A5 do not overlap with the orthogonal projection of the slot ST on the first substrate 11, that is, the two orthogonal projections (the orthographic projection of antenna patch 12 and the orthogonal projection of the slot ST) intersect with each other. Such a structure is conducive to further improving the energy radiated by the antenna patch.

As some implementations, the ratio of the area of the fourth region A4 to the area of the first region A1 ranges from 1 to 1.5, for example, is 1.2, 1.3, or the like. As some implementations, the ratio of the area of the fifth region A4 to the area of the first region A1 ranges from 1 to 1.5, for example, is 1.2, 1.3, or the like. In this way, it is conductive to further improving the energy radiated by the antenna patch.

In some implementations, as shown in FIG. 1B, the shape of the orthogonal projection of the slot ST on the first substrate 11 is rectangle. In some embodiments, the length-width ratio of the rectangle is 2:1, which is helpful to improve the energy radiated by the antenna patch.

Figure 1C:
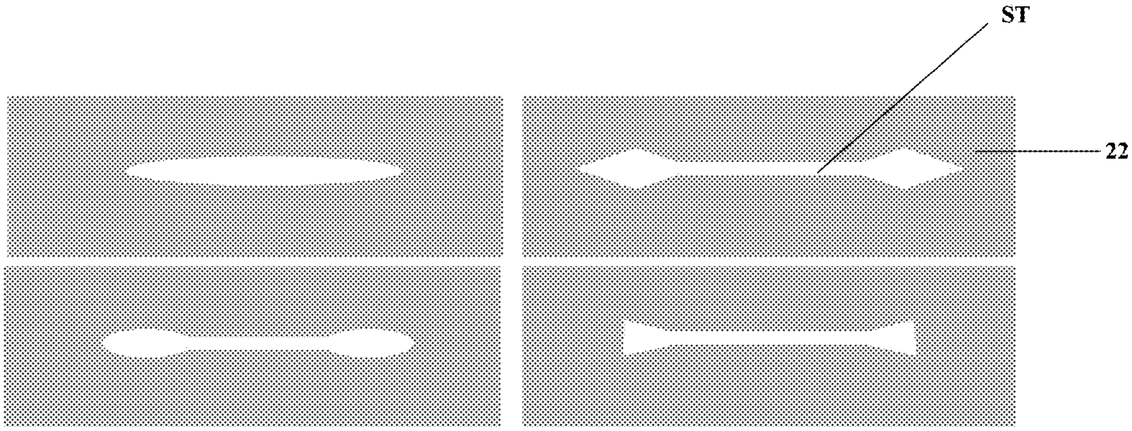
FIG. 1C is a schematic view showing shape of projection of a slot according to some implementations of the present disclosure.

FIG. 1C is a schematic view showing shape of projection of a slot according to some implementations of the present disclosure.

As shown in FIG. 1C, the orthogonal projection of the slot ST on the first substrate 11 is in a shape of oval, butterfly, diamond, or dumbbell. It should be understood that the slot ST may also be provided in other shapes.

Figure 2A:
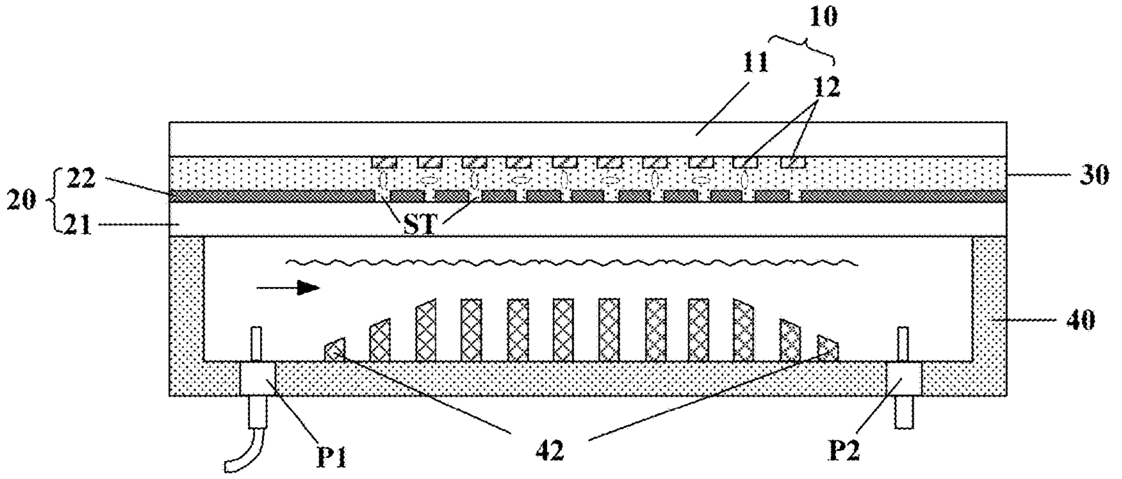
FIGS. 2A-2C are schematic structural views showing an antenna device according to other embodiments of the present disclosure.
Figure 2B:
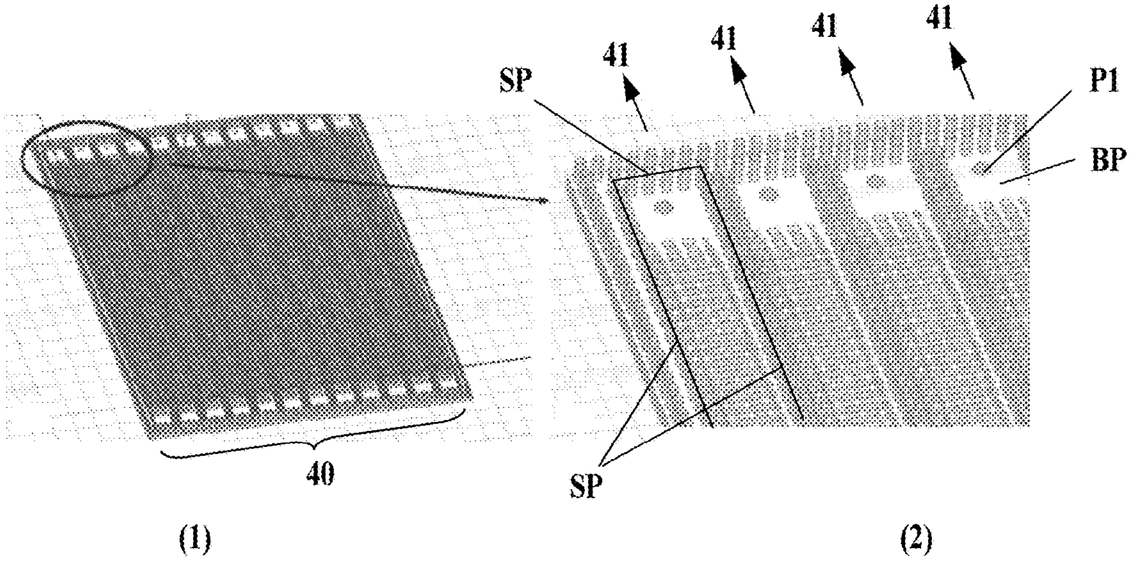
Figure 2C:
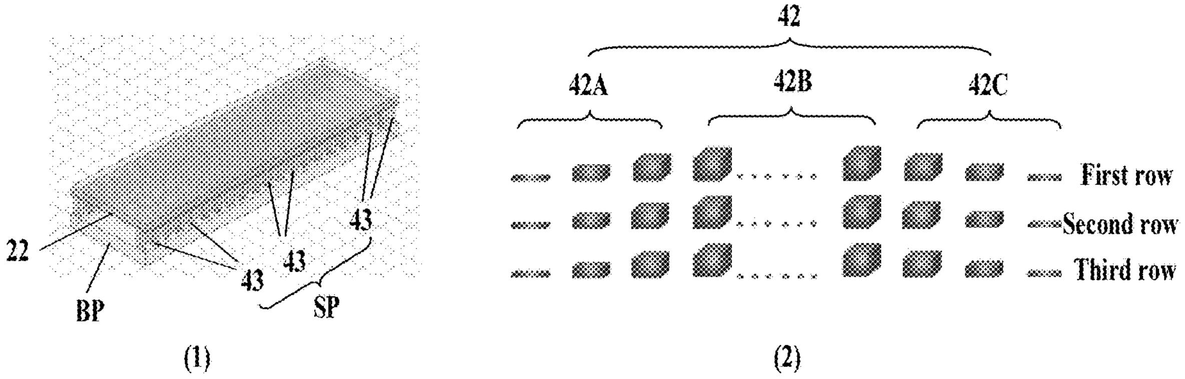

FIGS. 2A-2C are schematic structural views showing an antenna device according to other embodiments of the present disclosure. It is to be noted that in FIGS. 2B and 2C, (1) represents a left view, and (2) represents a right view.

As shown in FIG. 2A, in addition to comprising the first substrate structure 10, the second substrate structure 20 and the liquid crystal layer 30, the antenna device further comprises a waveguide structure 40 located on one side of the second substrate structure 20 away from the first substrate structure 10. The arrow direction shown in FIG. 2A is a propagation direction of electromagnetic wave. In addition, FIG. 2A also shows a coaxial feed port P1 and a port P2 for connection with a matching load.

As shown in FIG. 2B, the waveguide structure 40 comprises one or more cavities 41, each cavity comprising a bottom BP and a side SP connected to the bottom BP. For clarity, the contour of the side SP is depicted by a solid line in FIG. 2B. The cavity 41 may be filled with a medium, for example, air or other media having a low dielectric constant. In some embodiments, the distance between adjacent cavities 41 is the same.

For example, the materials of the bottom BP and the side SP comprise metals such as copper or aluminum. In some embodiments, the interior walls of the bottom BP and the side SP are plated with silver or gold. In some embodiments, the bottoms BP of different cavities 41 may be integrally provided, that is, the waveguide structure 40 comprises a shared bottom BP.

The bottom BP of each cavity 41 is provided with at least one row of first metal posts. In some embodiments, the bottom BP of each cavity 41 is provided with a plurality of rows of first metal posts, for example, three or four rows of first metal posts, spaced apart from each other in a direction perpendicular to the propagation direction of electromagnetic wave.

FIG. 2C schematically shows three rows of first metal posts. Each row of first metal posts comprises a plurality of first metal posts 42 arranged in the propagation direction of electromagnetic wave. In some embodiments, the distance between adjacent first metal posts 42 is the same. In some embodiments, the material of the first metal post 42, the material of the bottom BP and the material of the side SP are the same.

In the above embodiments, the bottom BP of each cavity 41 is provided with at least one row of first metal posts, which can reduce a wave velocity of electromagnetic wave and realize slow wave propagation. By combining the leaky wave antenna unit consisting of an antenna patch and a slot with a slow wave, it is helpful to further expand the beam scanning range of the antenna device.

As some implementations, the side SP of each cavity 41 may be a whole metal surface.

As other implementations, referring to the left view showing FIG. 2C, the side SP of each cavity 41 comprises a plurality of second metal posts 43, which can achieve a lower loss and a better electromagnetic shielding effect. In some embodiments, the ratio of the length, width, and height of the second metal post 43 may be 1:(0.8~1.2):(2.4~3.6), for example, the dimension of the second metal post 43 is 2 mm (length):2 mm (width):6 mm (height). In some embodiments, the distance between adjacent second metal posts 43 is the same as the length of the second metal post, for example, is 2 mm. The length of the second metal post 43 can be understood as the length of the second metal post 43 in the propagation direction of electromagnetic wave, the width of the second metal post 43 can be understood as the length of the second metal post 43 in a direction perpendicular to the propagation direction of electromagnetic wave, and the height of the second metal post 43 can be understood as the length of the second metal post 43 in a direction perpendicular to the bottom BP of the cavity.

In some embodiments, referring to FIG. 2C, the plurality of first metal posts 42 in each row of first metal posts comprises a first group of first metal posts 42A and a second group of first metal posts 42B spaced apart from each other in the propagation direction of electromagnetic wave. Here, the heights of the first group of first metal posts 42A is in a first monotonic change in the propagation direction of electromagnetic wave, while the heights of the second group of first metal posts 42B are the same. The first monotonic change may be, for example, monotonic increasing or monotonic decreasing.

For example, a cross section, along a plane parallel to the bottom BP, of each first metal post in the second group of first metal posts 42B has a same shape and a same area. For example, the shape of the cross section of each of the second group of first metal posts 42B is rectangle.

In the above embodiments, the plurality of first metal posts 42 in each row of first metal posts comprises the first group of first metal posts 42A with heights in a monotonic change and the second group of first metal posts 42B with the same height. Such a structure is helpful to reduce the transmission loss of the waveguide whilst expanding a beam scanning range of the antenna device.

In other embodiments, the plurality of first metal posts 42 in each row of first metal posts further comprises a third group of first metal posts 42C. The second group of first metal posts 42B are located between the first group of first metal posts 42A and the third group of first metal posts 42C, and the heights of the third group of first metal posts 42C is in a second monotonic change in the propagation direction of electromagnetic wave. Here, the second monotonic change is contrary to the first monotonic change. For example, the first monotonic change is monotonic increasing, while the second monotonic change is monotonic decreasing; for another example, the first monotonic change is monotonic decreasing, while the second monotonic change is monotonic increasing. Such a structure is helpful to further reduce the transmission loss of the waveguide.

Other implementations of the first substrate structure and the second substrate structure will be introduced below in conjunction with different embodiments.

Figure 3A:
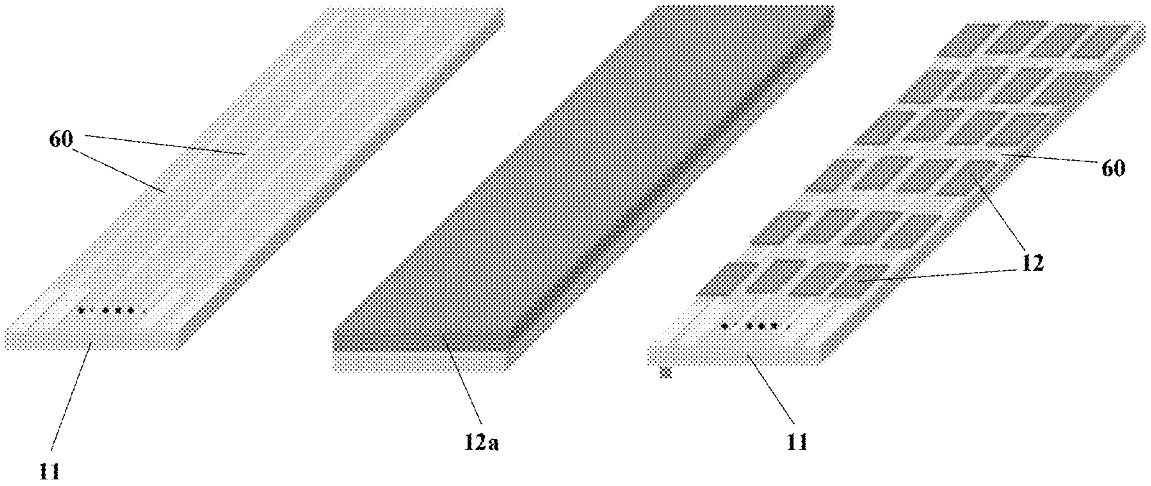
FIG. 3A is a schematic view showing a first substrate structure according to some embodiments of the present disclosure.
Figure 3B:
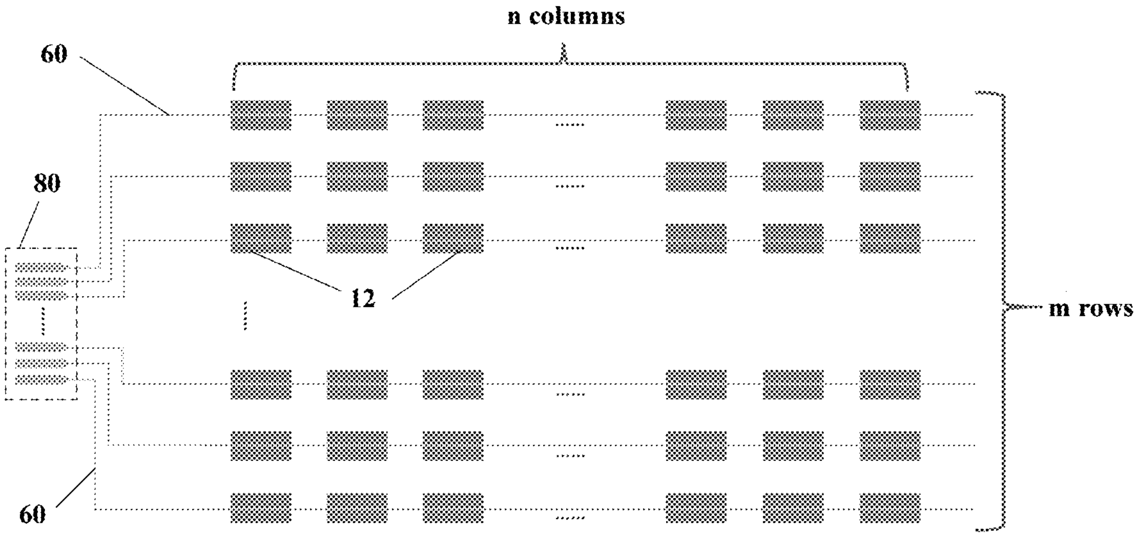
FIG. 3B is a schematic view showing an arrangement of a plurality of antenna patches according to some embodiments of the present disclosure.

First, some implementations of the first substrate structure will be introduced in conjunction with FIGS. 3A and 3B.

FIG. 3A is a schematic view showing a first substrate structure according to some embodiments of the present disclosure. To clearly illustrate different members, FIG. 3A shows different stages of forming the first substrate structure 10.

As shown in FIG. 3A, the first substrate structure 10 comprises a first substrate 11, a plurality of antenna patches

12 and a plurality of first signal lines 60. The antenna patch 12 may be obtained by patterning the metal layer 12*a*.

The plurality of antenna patches 12 and the plurality of first signal lines 60 are located on a same side (i.e., the first side) of the first substrate 11. Each first signal line 60 is connected to at least one of the plurality of antenna patches 12. For example, one first signal line 60 is connected to one antenna patch 12; for another example, one first signal line 60 is connected to two or more antenna patches 12. According to some implementations, the material of each first signal line 60 comprises indium tin oxide.

In some embodiments, the plurality of first signal lines 60 is located between the first substrate 11 and the plurality of antenna patches 12. For example, each first signal line 60 is in contact with at least one antenna patch 12.

In the above embodiments, the antenna device further comprises a plurality of first signal lines 60. A voltage can be applied to a plurality of antenna patches 12 via the plurality of first signal lines 60, thereby realizing deflection control of the liquid crystal and further changing the beam scanning direction of the antenna device.

FIG. 3B is a schematic view showing an arrangement of a plurality of antenna patches according to some embodiments of the present disclosure.

As shown in FIG. 3B, the plurality of antenna patches 12 is arranged in a matrix. For example, the plurality of antenna patches 12 are arranged in a matrix of m (row)×n (column). In some embodiments, m is 20, 40, 50, 60, 80, 90, 100, or the like, and n is 8, 10, 12, 15, 20, 25, 30, or the like.

A same row of antenna patches 12 are connected to a same first signal line 60, and different rows of antenna patches 12 are connected to different first signal lines 60. In other words, the number of the plurality of first signal lines 60 is m. In this way, it is helpful to reduce the number of the plurality of first signal lines 60.

FIG. 3B also shows a circuit board 80, for example, a flexible printed circuit board, connected to a plurality of first signal lines 60. A voltage can be applied to the plurality of first signal lines 60 via the circuit board 80.

The inventors have noticed that, the position of the first signal line 60 can affect the accuracy of beam direction control of the antenna device. Accordingly, the embodiments of the present disclosure also provide the following solutions.

In some embodiments, the orthographic projection of at least one of the plurality of first signal lines 60 on the first substrate 11 does not overlap with the orthographic projection of each slot ST on the first substrate 11. In this way, an adverse effect of the first signal line 60 on the radiation energy of the antenna patch 12 can be reduced, thereby improving the accuracy of beam direction control.

For example, the orthographic projection of each first signal line 60 on the first substrate 11 does not overlap with the orthographic projection of each slot ST on the first substrate 11. In this way, the accuracy of beam direction control can be further improved.

Figure 4:
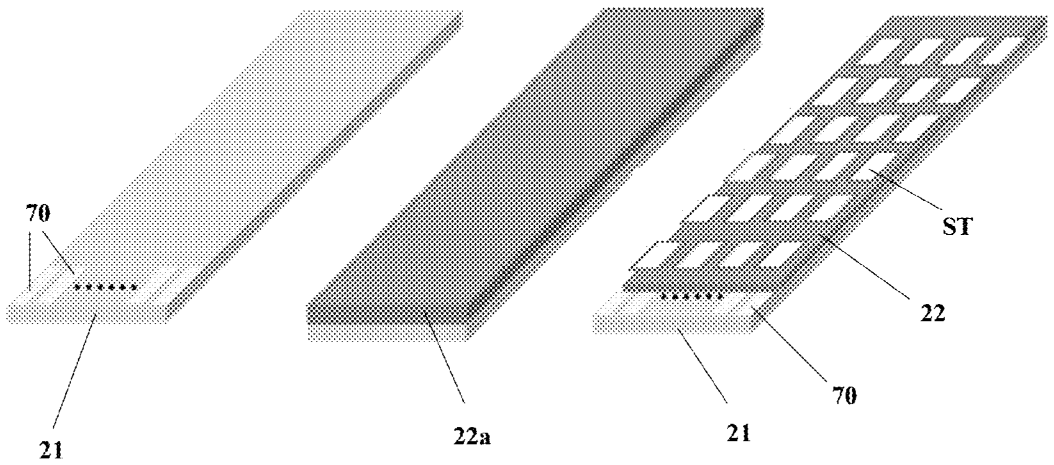
FIG. 4 is a schematic view showing a second substrate structure according to some embodiments of the present disclosure.

Next, some implementations of the second substrate structure will be introduced in conjunction with FIG. 4.

FIG. 4 is a schematic view showing a second substrate structure according to some embodiments of the present disclosure. To clearly illustrate different members, FIG. 4 shows different stages of forming the second substrate structure 20.

As shown in FIG. 4, the second substrate structure 20 comprises a second substrate 21, a metal layer 22 having a plurality of slots ST, and at least one second signal line 70 connected to the metal layer 22. The metal layer 22 and the second signal line 70 are located on a same side (i.e., the second side) of the second substrate 21. The metal layer 22 may be obtained by patterning the metal layer 22*a*. The material of each second signal line 70 comprises, for example, indium tin oxide.

In some embodiments, the second signal line 70 is located between the second substrate 21 and the metal layer 22 and the second signal line 70 is in contact with the metal layer 22. For example, the second signal line 70 may be grounded.

In the above embodiments, the antenna device further comprises at least one second signal line 70. A voltage can be applied to the metal layer 22 via the second signal line 70, thereby realizing deflection control of the liquid crystal and further changing the beam scanning direction of the antenna device.

As some implementations, the second substrate structure 20 comprises one second signal line 70. As other implementations, referring to FIG. 4, the second substrate structure 20 comprises a plurality of second signal lines 70, thus the reliability of applying a voltage to the metal layer 22 is improved.

The inventors have also noticed that, the position of the second signal line 70 may also affect the accuracy of beam direction control of the antenna device. Accordingly, the embodiments of the present disclosure also provide the following solutions.

In some embodiments, the orthographic projection of at least one second signal line 70 on the second substrate 21 does not overlap with the orthographic projection of each slot ST on the first substrate 11. For example, the orthographic projection of each second signal line 70 on the second substrate 21 does not overlap with the orthographic projection of each slot ST on the first substrate 11. In this way, an adverse effect of the second signal line 70 on the radiation energy of the antenna patch 12 is reduced, thereby further improving the accuracy of beam direction control.

Figure 5A:
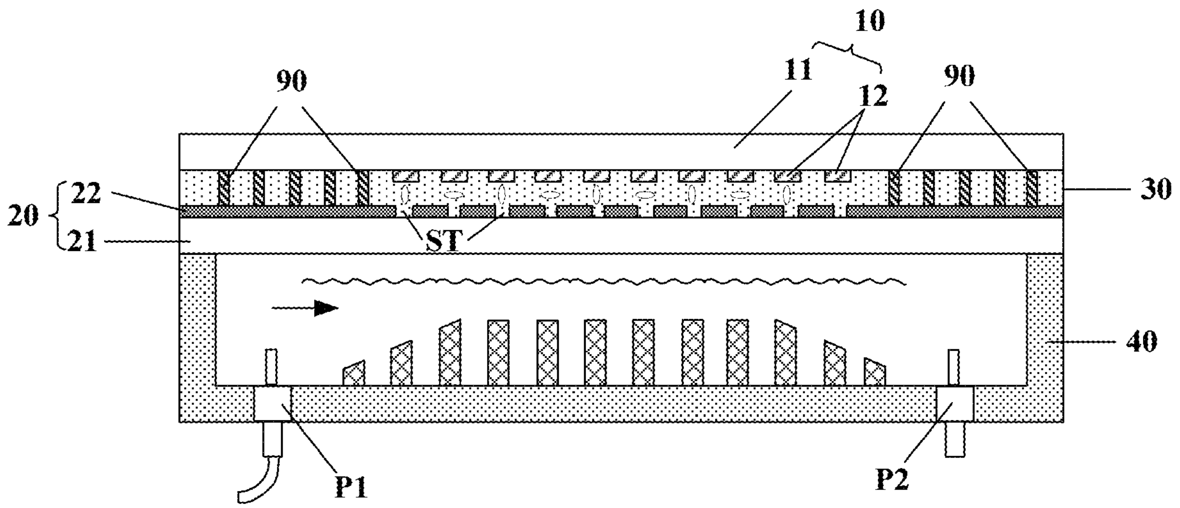
FIG. 5A is a schematic structure view showing an antenna device according to still other embodiments of the present disclosure.

FIG. 5A is a schematic structure view showing an antenna device according to still other embodiments of the present disclosure.

As shown in FIG. 5A, compared with the embodiment shown in FIG. 2A, the antenna device further comprises a plurality of support members 90 located between the metal layer 22 and the first substrate 11. The orthogonal projections of the plurality of support members 90 on the first substrate 11 do not overlap with the orthogonal projections of the plurality of slots ST on the first substrate 11, and do not overlap with the orthogonal projections of the plurality of antenna patches 12 on the first substrate 11.

In the above embodiments, a plurality of support members 90 are provided, thus it is helpful to improve the height uniformity of the space between the first substrate structure 10 and the second substrate structure 20 to improve the reliability of the antenna device without affecting the accuracy of beam direction control.

Figure 5B:
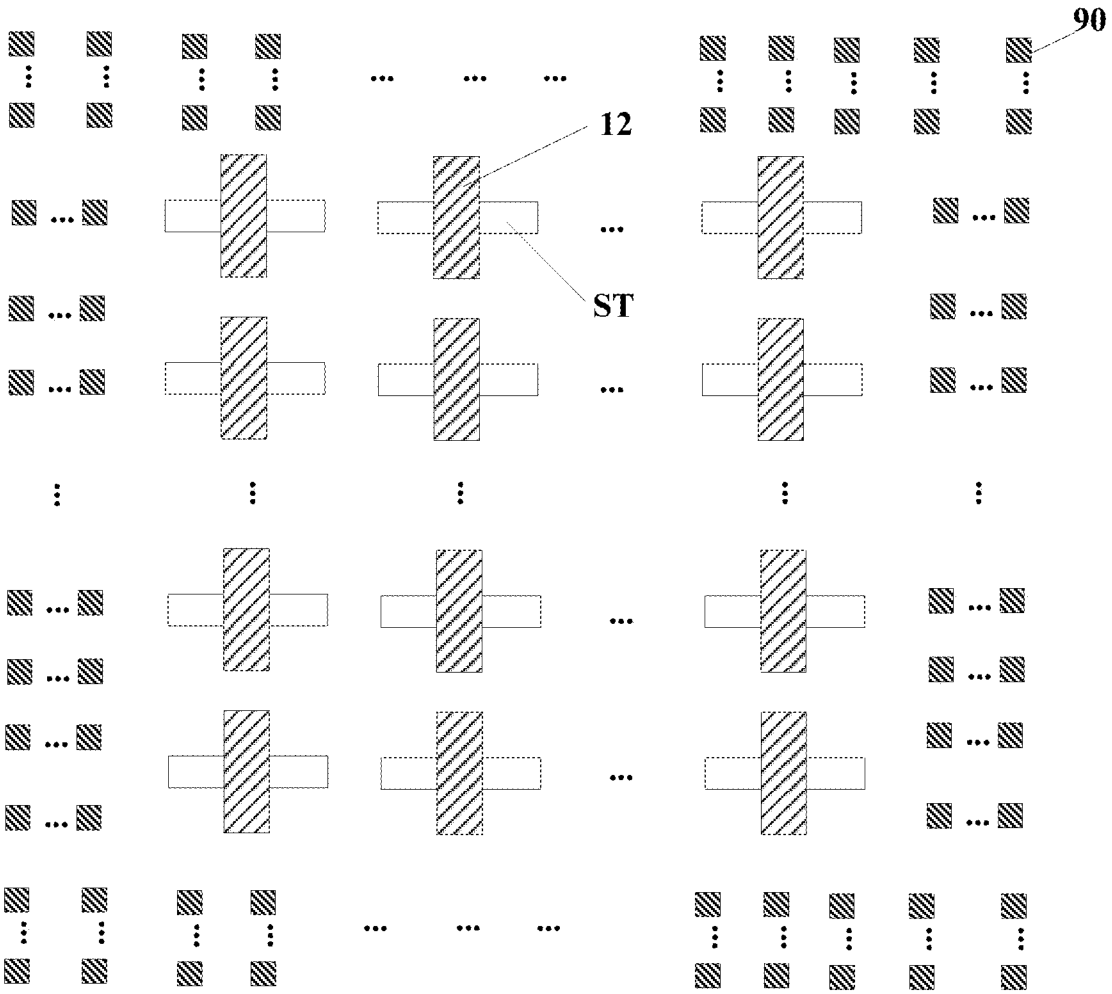
FIG. 5B is a schematic view showing distribution of a plurality of support members according to some embodiments of the present disclosure.

FIG. 5B is a schematic view showing distribution of a plurality of support members according to some embodiments of the present disclosure.

As shown in FIG. 5B, the orthographic projections of the plurality of support members 90 on the first substrate 11 surround the orthographic projections of the plurality of slots ST on the first substrate 11, and the orthographic projections of the plurality of support members 90 on the first substrate 11 surround the orthographic projections of the plurality of antenna patches 12 on the first substrate 11. In this way, the effect on the accuracy of beam direction control can be more effectively avoided.

Figure 6:
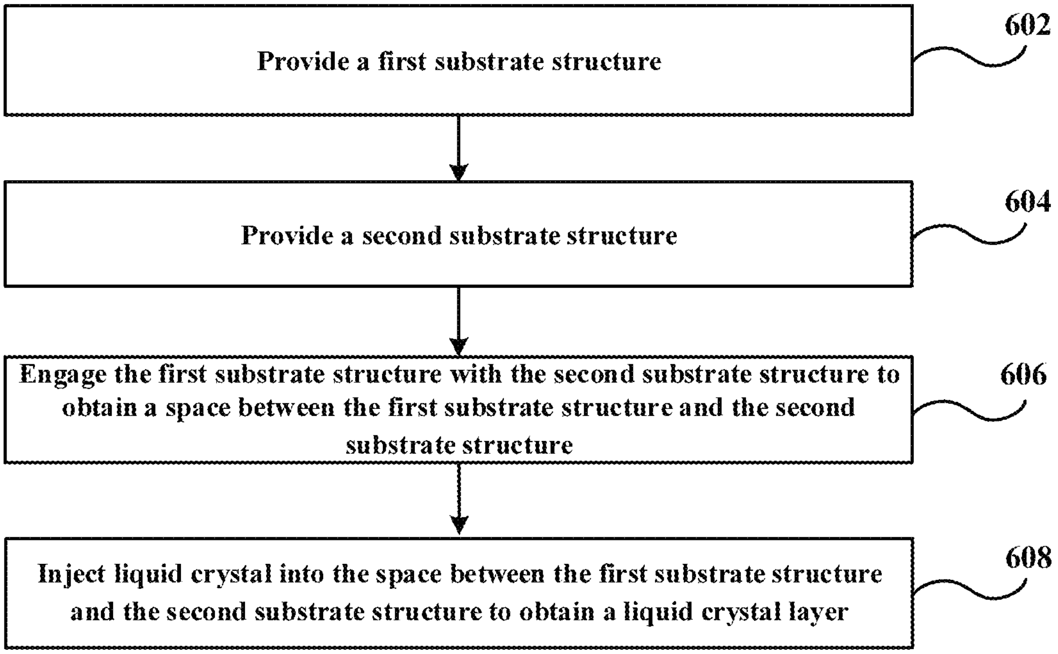
FIG. 6 is a flowchart showing a manufacturing method of an antenna device according to some embodiments of the present disclosure.

FIG. 6 is a flowchart showing a manufacturing method of an antenna device according to some embodiments of the present disclosure.

At step 602, a first substrate structure is provided. Here, the first substrate structure comprises a first substrate and a plurality of antenna patches located on a first side of the first substrate. In some embodiments, the first substrate structure further comprises a plurality of first signal lines.

For example, a first metal layer may be first formed on the first substrate and then patterned to obtain a plurality of antenna patches. For example, the first metal layer may be formed by a process such as magnetron sputtering, evaporation, or electroplating.

At step 604, a second substrate structure is provided. Here, the second substrate structure comprises a second substrate and a metal layer having a plurality of slots. The metal layer is located on a second side of the second substrate. In some embodiments, the second substrate structure further comprises at least one second signal line.

For example, a second metal layer may be first formed on the second substrate and then patterned to obtain the metal layer having a plurality of slots. Similarly, the second metal layer may be formed by a process such as magnetron sputtering, evaporation, or electroplating.

At step 606, the first substrate structure is engaged with the second substrate structure to obtain a space between the first substrate structure and the second substrate structure.

After the engagement, the second substrate structure is located on one side of the plurality of antenna patches away from the first substrate, and the second side described above is one side of the second substrate close to the first substrate. In addition, after the engagement, the region where the orthographic projection of each slot on the first substrate overlaps with the orthographic projection of a corresponding antenna patch on the first substrate is a first region, and the orthographic projection of each slot on the first substrate further comprises a second region and a third region. The first region is located between the second region and the third region.

For example, an edge of the first substrate structure may be engaged with an edge of the second substrate structure by a sealing member. In this way, the sealing member, the first substrate structure and the second substrate structure enclose a space.

At step 608, liquid crystal is injected into the space between the first substrate structure and the second substrate structure to obtain a liquid crystal layer.

The antenna device formed in the above embodiments comprises a plurality of antenna patches and a metal layer having a plurality of slots. With this structure, the deflection direction of the liquid crystal can be changed by changing a voltage of a plurality of antenna patches and a voltage of the metal layer, thereby changing the energy radiated by the antenna patch and further changing the beam direction of the antenna device. Such a structure is helpful to expand the beam scanning range of the antenna device.

The embodiments of the present disclosure also provide a control method of an antenna device according to any of the above embodiments. The control method comprises: controlling a voltage of the plurality of antenna patches and a voltage of the metal layer so that the beam direction of the antenna device is a desired beam direction.

Figure 7:
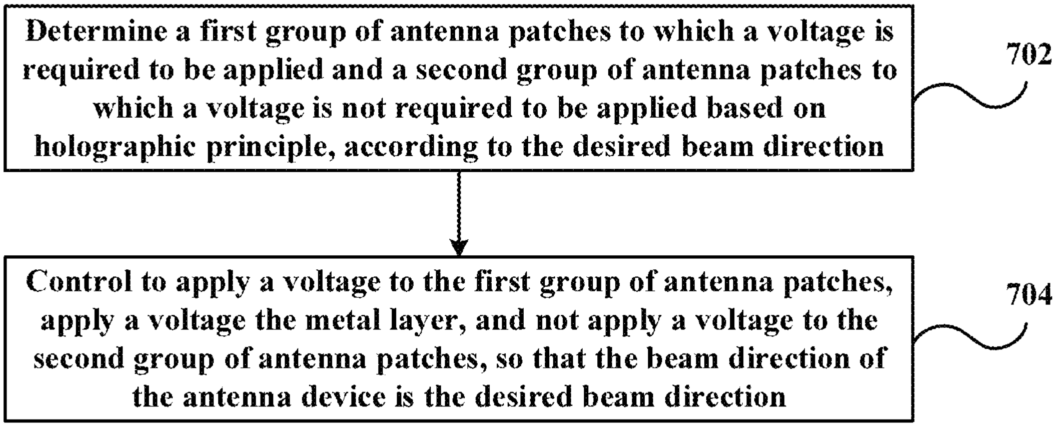
FIG. 7 is a flowchart showing a control method of an antenna device according to some embodiments of the present disclosure.

FIG. 7 is a flowchart showing a control method of an antenna device according to some embodiments of the present disclosure.

At step 702, a first group of antenna patches to which a voltage is required to be applied and a second group of antenna patches to which a voltage is not required to be applied are determined based on holographic principle, according to a desired beam direction.

It should be understood that, since positions of the plurality of antenna patches are different, when voltages are applied to different antenna patches, the antenna device has different beam directions. For any desired beam direction, it can be inferred, based on holographic principle, which antenna patches are required to be applied to a voltage and which antenna patches are not required to be applied to a voltage.

In some embodiments, the energy required to be radiated by each antenna patch is determined according to the desired beam direction; and a voltage required to be applied to each antenna patch is determined according to a corresponding relationship between the energy radiated by the antenna patch and the voltage applied to the antenna patch. It should be understood that, if a voltage required to be applied to the antenna patch is 0, a voltage is not required to be applied to the antenna patch; and if a voltage required to be applied to the antenna patch is not 0, a voltage is required to be applied to the antenna patch.

As the dielectric constant of the liquid crystal changes, the energy radiated by the antenna patch will change accordingly, so that a change curve between the energy radiated by the antenna patch and the dielectric constant of the liquid crystal is obtained. In a case where the voltage applied to the antenna patch changes, the dielectric constant of the liquid crystal will change. According to the above change curve, a corresponding relationship between the energy radiated by the antenna patch and the voltage applied to the antenna patch can be obtained.

In other embodiments, the energy required to be radiated by each antenna patch is determined according to the desired beam direction. In a case where the energy to be radiated by the antenna patch is greater than or equal to a preset value, it is determined that a voltage is required to be applied to the antenna patch; and in a case where the energy to be radiated by the antenna patch is less than a preset value, it is determined that a voltage is not required to be applied to the antenna patch. In this way, the first group of antenna patches to which a voltage is required to be applied is determined.

In some embodiments, after the energy to be radiated by each antenna patch is obtained, the energy to be radiated by each antenna patch is normalized; and then to it is determine whether a voltage is required to be applied to the antenna patch according to a relationship between a normalized value of the energy required to be radiated by the antenna and a preset value. For example, the difference between the energy V to be radiated by each antenna patch and a minimum value Min among the energies required to be radiated by the plurality of antenna patches is a first value, the difference between a maximum value Max among the energies required to be radiated by the plurality of antenna patches and the minimum value Min among the energies required to be radiated by the plurality of antenna patches is a second value, and the normalized value V' of the energy V required to be radiated by each antenna patch equals to the first value/the second value.

At step 704, control is performed to apply a voltage to the first group of antenna patches, apply a voltage to the metal layer, and not apply a voltage to the second group of antenna patches, so that the beam direction of the antenna device is the desired beam direction.

In some embodiments, after determining a voltage required to be applied to each antenna patch of the first group of antenna patches, a corresponding voltage may be applied to each antenna patch.

In other embodiments, a same voltage may be applied to the first group of antenna patches. For example, a voltage applied to the first group of antenna patches may be a saturated voltage that causes the liquid crystal to deflect, so that each antenna patch of the first group of antenna patches radiates a maximum energy.

In the above embodiments, since the structure of the antenna device is helpful to expand the beam scanning range of the antenna device, a greater range of the desired beam direction is obtained by controlling the voltage of the antenna patch in the antenna device and the voltage of the metal layer in the antenna device.

Figure 8:
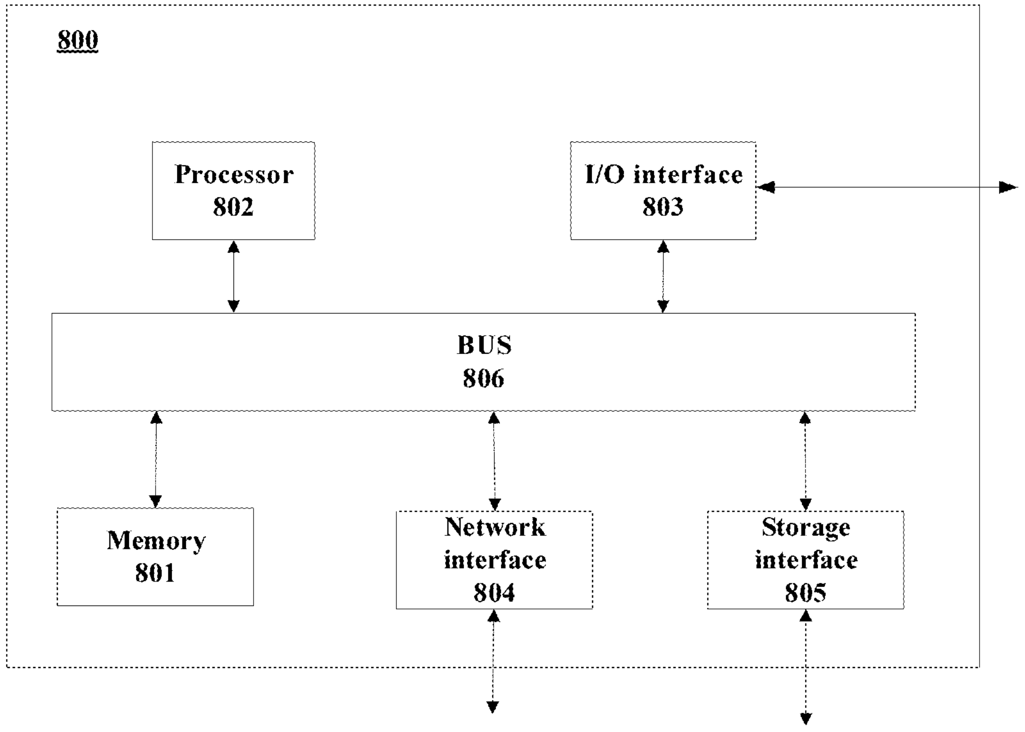
FIG. 8 is a schematic structural view showing a control device of an antenna device according to some embodiments of the present disclosure.

FIG. 8 is a schematic structural view showing a control device of an antenna device according to some embodiments of the present disclosure.

As shown in FIG. 8, the control device 800 of the antenna device comprises a memory 801 and a processor 802 coupled to the memory 801. The processor 802 is configured to perform the method according to any of the above embodiments based on instructions stored in the memory 801.

The memory 801 may comprise, for example, a system memory, a fixed nonvolatile storage medium, or the like. The system memory may store, for example, an operation system, an application program, a boot loader, and other programs.

The control device 800 of the antenna device may further comprise an I/O interface 803, a network interface 804, and a storage interface 805, and the like. These interfaces 803, 804 and 805 therebetween, as well as the memory 801 and the processor 802 therebetween, may be connected by a bus 806, for example. The I/O interface 803 provides a connection interface for I/O devices such as a display, a mouse, a keyboard, or a touch screen. The network interface 804 provides a connection interface for various networking devices. The storage interface 805 provides a connection interface for an external storage device such as a SD card or a USB flash drive.

The embodiments of the present disclosure also provide a computer-readable storage medium comprising computer program instructions that, when executed by a processor, implement the method according to any of the above embodiments.

The embodiments of the present disclosure also provide a computer program product, comprising a computer program that, when executed by a processor, implements the method according to any of the above embodiments.

The embodiments of the present disclosure also provide an electronic device, which may comprise the antenna device according to any of the above embodiments. In some embodiments, the electronic device may be any product or member that requires an antenna, such as a mobile terminal (for example, a cell phone), a notebook computer, or a navigator.

Various embodiments in this specification are described in a progressive manner, and each embodiment focuses on description of the differences from other embodiments. For the same or similar parts between various embodiments, reference can be made to each other. As for the embodiments of the device, since they substantially correspond to the embodiments of the method, the description thereof is relatively simple. For the relevant parts, reference can be made to description of the embodiments of the method.

Those skilled in the art should understand that, the embodiments of the present disclosure may be provided as a method, a device, or a computer program product. Therefore, embodiments of the present disclosure can take the form of an entirely hardware embodiment, an entirely software embodiment or an embodiment combining both hardware and software. Moreover, the present disclosure may take the form of a computer program product embodied on one or more computer-usable non-transitory storage media (including but not limited to disk storage, CD-ROM, optical memory, etc.) having computer-usable program code embodied therein.

The present disclosure is described with reference to flowcharts and/or block diagrams of methods, devices (systems) and computer program products according to embodiments of the present disclosure. It should be understood that each process in the flowcharts and/or the functions specified in one or more blocks of the block diagrams may be implemented by computer program instructions. The computer program instructions may be provided to a processor of a general-purpose computer, a special purpose computer, an embedded processor, or other programmable data processing device to generate a machine, making the instructions executed by a processor of a computer or other programmable data processing device generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture including an instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. An antenna device, comprising:

a first substrate structure, comprising:

- a first substrate, and
- a plurality of antenna patches located on a first side of the first substrate, and a plurality of first signal lines located between the first substrate and the plurality of antenna patches;

a second substrate structure located on one side of the plurality of antenna patches away from the first substrate, and comprising:

a second substrate, and a metal layer having a plurality of slots and located on a second side of the second substrate close to the first substrate, wherein one slot of the plurality of slots corresponds to one antenna patchpatch of the plurality of antenna patches, a region where an orthographic projection of each slot of the plurality of antenna patches on the first substrate overlaps with an orthographic projection of a corresponding antenna patch on the first substrate is a first region, the orthographic projection of the each slot on the first substrate further comprises a second region and a third region, and the first region is located between the second region and the third region;

a liquid crystal layer located between the first substrate structure and the second substrate structure; and a waveguide structure located on one side of the second substrate structure away from the first substrate structure and comprising one or more cavities, wherein a bottom of each cavity is provided with at least one row of first metal posts, and each row of first metal posts comprise a plurality of first metal posts arranged in a propagation direction of electromagnetic wave, wherein the plurality of first metal posts comprises a first group of first metal posts and a second group of first metal posts spaced apart from each other in the propagation direction of electromagnetic wave, heights of the first group of first metal posts are in a first monotonic change in the propagation direction of electromagnetic wave, and heights of the second group of first metal posts are the same, wherein:

each first signal line is connected to at least one of the plurality of antenna patches, each first signal line is in contact with the connected at least one of the plurality of antenna patches, and an orthographic projection of each first signal line on the first substrate does not overlap with the orthographic projection of the each slot on the first substrate, a ratio of an area of each of the second region and the third region to an area of the first region ranges from 1.5 to 2, a ratio of an area of each of the fourth region and the fifth region to an area of the first region ranges from 1 to 1.5, and a side of each cavity connected to the bottom comprises a plurality of second metal posts, a ratio of a length, a width, and a height of each second metal post being 1:(0.8~1.2):(2.4~3.6).

2. The antenna device according to claim 1, wherein an orthographic projection of each antenna patch on the first substrate further comprises a fourth egion and a fifth region, and the first region is located between the fourth region and the fifth region.

3. The antenna device according to claim 1, wherein the plurality of antenna patches is arranged in a matrix, a same row of antenna patches is connected to a same first signal line, and different rows of antenna patches are connected to different first signal lines.

4. The antenna device according to claim 1, wherein the second substrate structure further comprises:

at least one second signal line located on the second side of the second substrate and connected to the metal layer.

5. The antenna device according to claim 4, wherein an orthographic projection of the at least one second signal line on the second substrate does not overlap with the orthographic projection of each slot on the first substrate.

6. The antenna device according to claim 1, wherein the plurality of first metal posts further comprises a third group of first metal posts, wherein:

the second group of first metal posts are located between the first group of first metal posts and the third group of first metal posts, and heights of the third group of first metal posts are in a second monotonic change in the propagation direction of electromagnetic wave, wherein the second monotonic change is contrary to the first monotonic change.

7. The antenna device according to claim 1, wherein a cross section of each metal post of the second group of first metal posts along a plane parallel to the bottom has a same shape and a same area.

8. The antenna device according to claim 1, wherein the at least one row of first metal posts comprises a plurality of rows of first metal posts spaced apart from each other in a direction perpendicular to the propagation direction of electromagnetic wave.

9. The antenna device according to claim 1, wherein the bottom of each cavity is provided with a coaxial feed port.

10. The antenna device according to claim 1, further comprising:

a plurality of support members located between the metal layer and the first substrate, wherein orthogonal projections of the plurality of support members on the first substrate do not overlap with orthogonal projections of the plurality of slots on the first substrate, and do not overlap with orthogonal projections of the plurality of antenna patches on the first substrate.

11. The antenna device according to claim 10, wherein the orthographic projections of the plurality of support members on the first substrate surround the orthographic projections of the plurality of slots on the first substrate and surround the orthographic projections of the plurality of antenna patches on the first substrate.

12. An electronic device, comprising the antenna device according to claim 1.

13. A control method of the antenna device according to claim 1, comprising:

controlling a voltage of the plurality of antenna patches and a voltage of the metal layer so that a beam direction of the antenna device is a desired beam direction.

14. A manufacturing method of an antenna device, comprising:

providing a first substrate structure, wherein the first substrate structure comprises a first substrate, a plurality of antenna patches located on a first side of the first substrate, and a plurality of first signal lines located between the first substrate and the plurality of antenna patches;

providing a second substrate structure, wherein the second substrate structure comprises a second substrate and a metal layer having a plurality of slots, the metal layer is located on a second side of the second substrate, and one slot of the plurality of slots corresponds to one antenna patch of the plurality of antenna patches;

engaging the first substrate structure with the second substrate structure to obtain a space between the first substrate structure and the second substrate structure, wherein after the engaging:

the second substrate structure is located on one side of the plurality of antenna patches away from the first substrate, and the metal layer is located on the second side of the second substrate close to the first substrate, and a region where an orthographic projection of each slot of the plurality of antenna patches on the first substrate overlaps with an orthographic projection of a corresponding antenna patch on the first substrate is a first region, the orthographic projection of the each slot on the first substrate further comprises a second region and a third region, and the first region is located between the second region and the third region; and injecting liquid crystal into the space to obtain a liquid crystal layer, wherein a waveguide structure is located on one side of the second substrate structure away from the first substrate structure and comprises one or more cavities, wherein a bottom of each cavity is provided with at least one row of first metal posts, and each row of first metal posts comprise a plurality of first metal posts arranged in a propagation direction of electromagnetic wave, wherein the plurality of first metal posts comprises a first group of first metal posts and a second group of first metal posts spaced apart from each other in the propagation direction of electromagnetic wave, heights of the first group of first metal posts are in a first monotonic change in the propagation direction of electromagnetic wave, and heights of the second group of first metal posts are the same, wherein each first signal line is connected to at least one of the plurality of antenna patches, each first signal line is in contact with the connected at least one of the plurality of antenna patches, and an orthographic projection of each first signal line on the first substrate does not overlap with the orthographic projection of the each slot on the first substrate, wherein a ratio of an area of each of the second region and the third region to an area of the first region ranges from 1.5 to 2, wherein a ratio of an area of each of the fourth region and the fifth region to an area of the first region ranges from 1 to 1.5, and wherein a side of each cavity connected to the bottom comprises a plurality of second metal posts, a ratio of a length, a width, and a height of each second metal post being 1:(0.8~1.2):(2.4~3.6).

15. The control method according to claim 13, wherein the controlling a voltage of the plurality of antenna patches and a voltage of the metal layer so that a beam direction of the antenna device is a desired beam direction comprises:

determining a first group of antenna patches to which a voltage is required to be applied and a second group of antenna patches to which a voltage is not required to be applied based on holographic principle, according to the desired beam direction; and controlling to apply a voltage to the first group of antenna patches, apply a voltage the metal layer, and not apply a voltage to the second group of antenna patches, so that the beam direction of the antenna device is the desired beam direction.

* * * * *